United States Patent [19]
Fleming et al.

[11] Patent Number: 5,752,735
[45] Date of Patent: May 19, 1998

[54] ADJUSTABLE COVER APPARATUS FOR INTERCHANGEABLE, MULTISIZE, OPEN TOP TRUCK CONTAINERS

[75] Inventors: Garold L. Fleming; Billy J. Pfenninger, both of Hutchinson, Kans.

[73] Assignee: Krause Plow Corporation, Inc., Hutchinson, Kans.

[21] Appl. No.: 742,374

[22] Filed: Nov. 1, 1996

Related U.S. Application Data

[63] Continuation of Ser. No. 494,381, Jun. 26, 1995, abandoned.
[51] Int. Cl.[6] ............................................ B60P 7/04
[52] U.S. Cl. ............................................ 296/98; 160/74
[58] Field of Search ............................. 296/98, 100, 104; 160/74, 80

[56] References Cited

U.S. PATENT DOCUMENTS

| | | | |
|---|---|---|---|
| 3,549,198 | 12/1970 | Cappello | 296/100 |
| 3,868,142 | 2/1975 | Bachano et al. | 296/98 |
| 4,157,202 | 6/1979 | Bachand | 296/100 |
| 4,463,563 | 8/1984 | Krehbiel | 91/402 X |
| 4,673,208 | 6/1987 | Tsukamoto | 296/98 |
| 4,874,196 | 10/1989 | Goldstein | 296/98 |
| 4,976,336 | 12/1990 | Curran | 91/420 X |
| 4,981,317 | 1/1991 | Acosta | 160/72 |
| 4,981,319 | 1/1991 | Gerzeny et al. | 296/99.1 |
| 5,292,169 | 3/1994 | O'Brian | 296/98 |

OTHER PUBLICATIONS

Pioneer Brochure, "The Hydra Cover" Apr. 12, 1991.

*Primary Examiner*—Dennis H. Pedder
*Attorney, Agent, or Firm*—Hovey, Williams, Timmons & Collins

[57] ABSTRACT

A tarping apparatus for the open top container of a refuse handling truck has a pair of tarp deployment arms on opposite sides of the container that pull the tarp onto and off of the open top of the container as the arms are hydraulically swung back and forth along the container. One end of the tarp is anchored to a stationary mast at the front end of the truck body while the opposite end of the tarp is wound around a spring-loaded take-up roll that pays out the tarp as the arms are swung rearwardly and then automatically rolls up the slack as the arms are returned toward the front end of the truck. If necessary to accommodate dimensional variances between different size containers which may be carried by the truck, the pivot points for the deployment arms may be adjustably shifted by hydraulic cylinders either forwardly or rearwardly such that the arc of travel of the tarp roll is correspondingly displaced either forwardly or rearwardly. The slide cylinders for adjusting the pivot points are connected in a master-slave series relationship to promote uniform operation, and the swing cylinders for the deployment arms are likewise connected in a master-slave series relationship to similarly promote uniformity of operation.

20 Claims, 6 Drawing Sheets

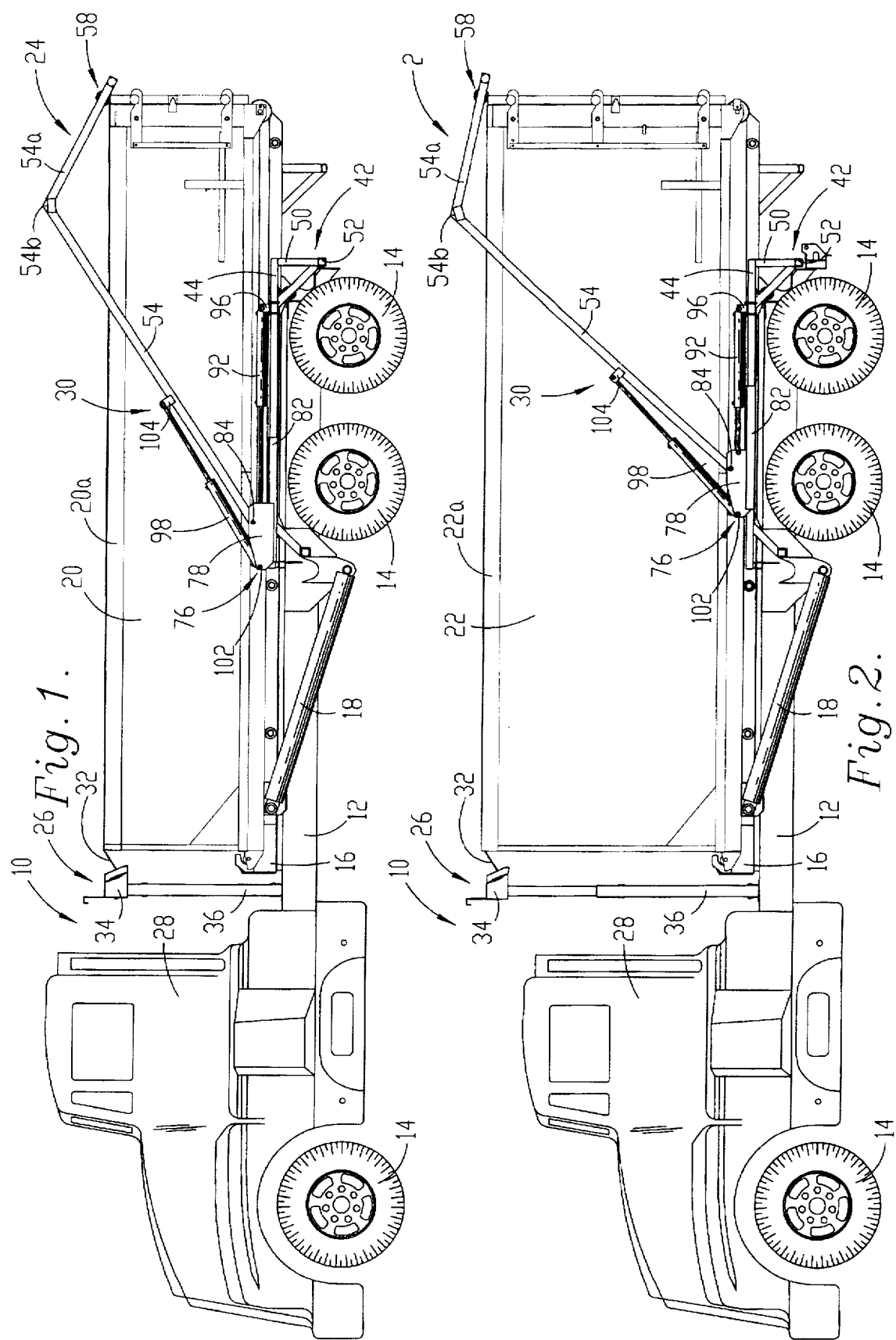

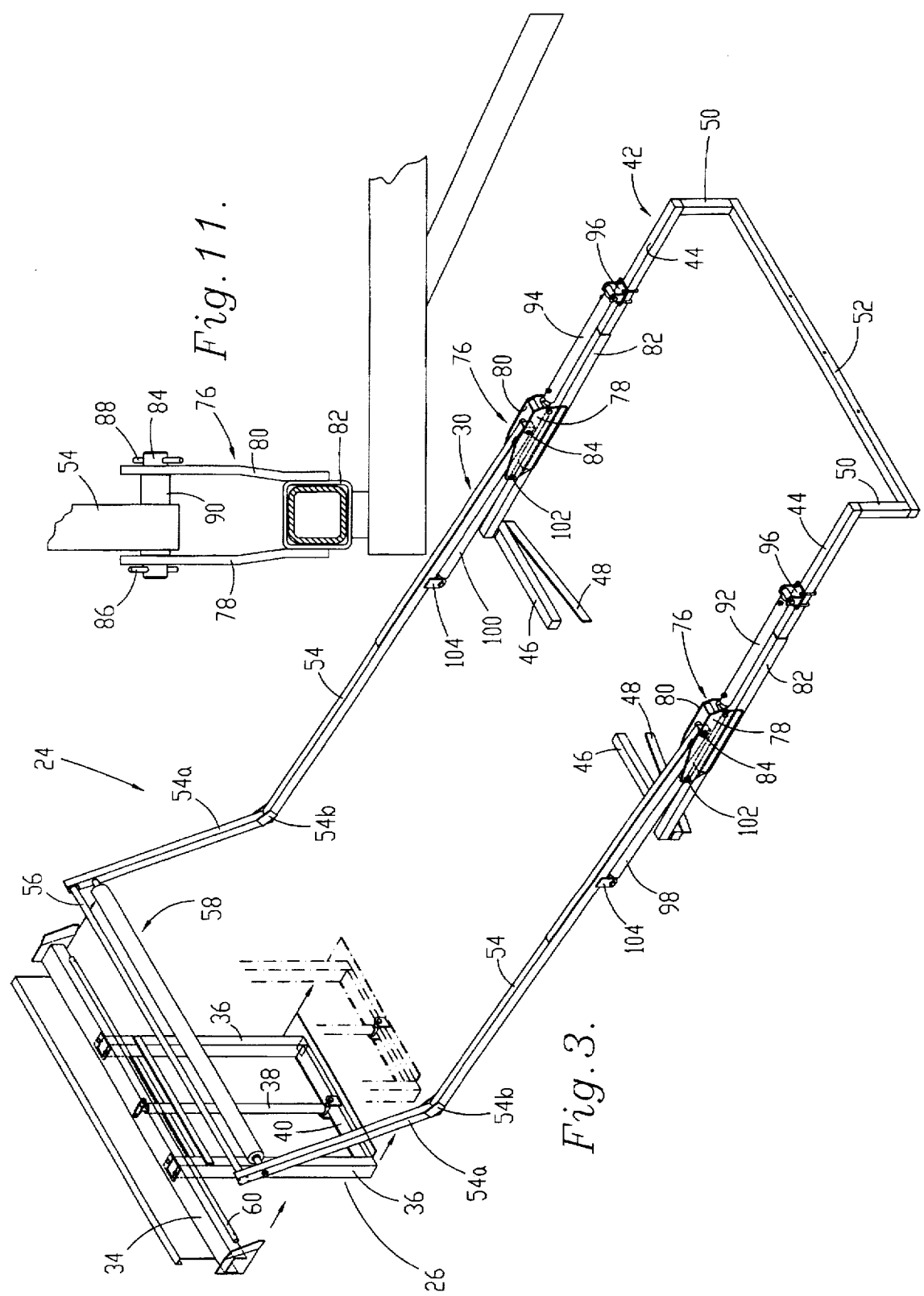

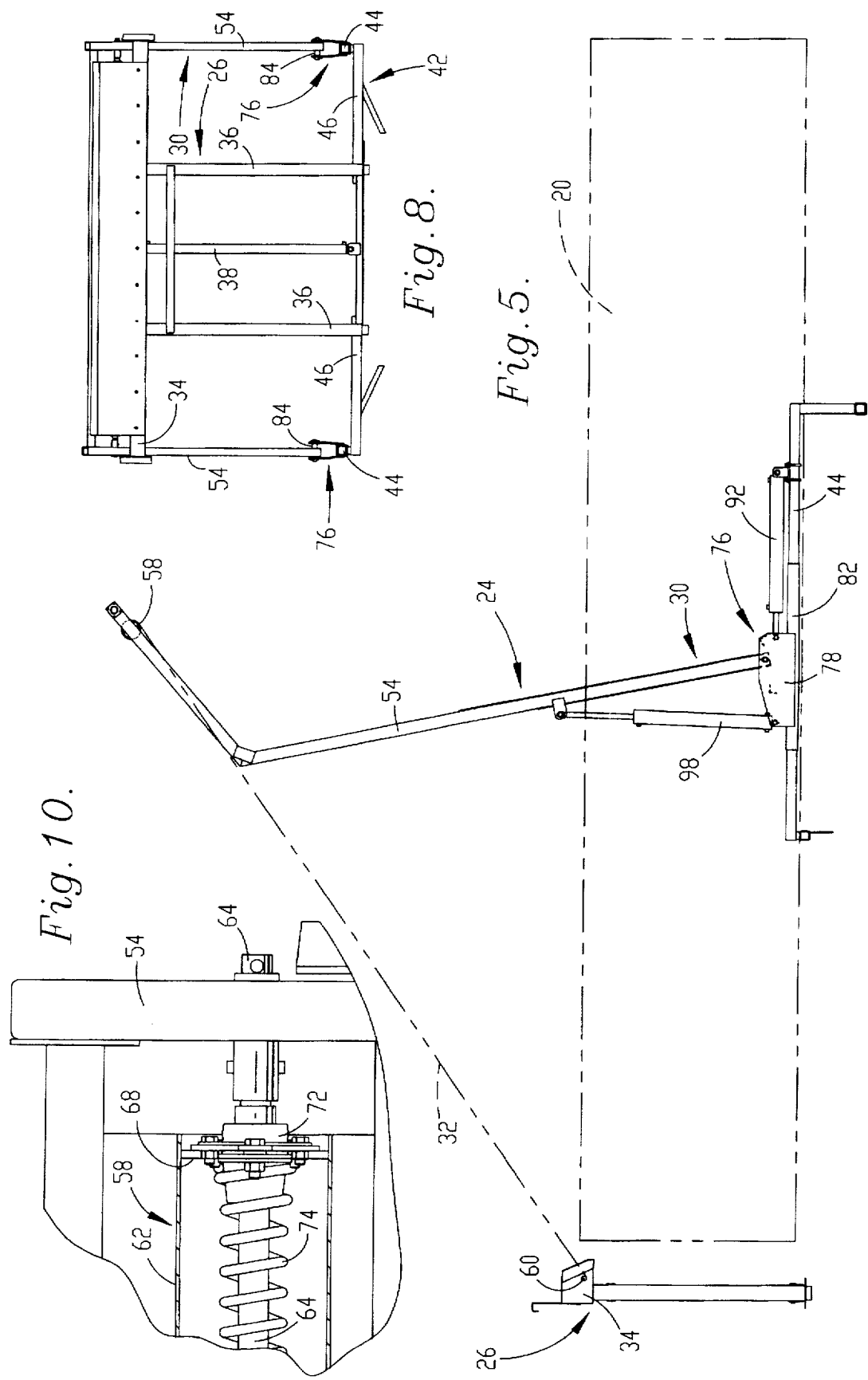

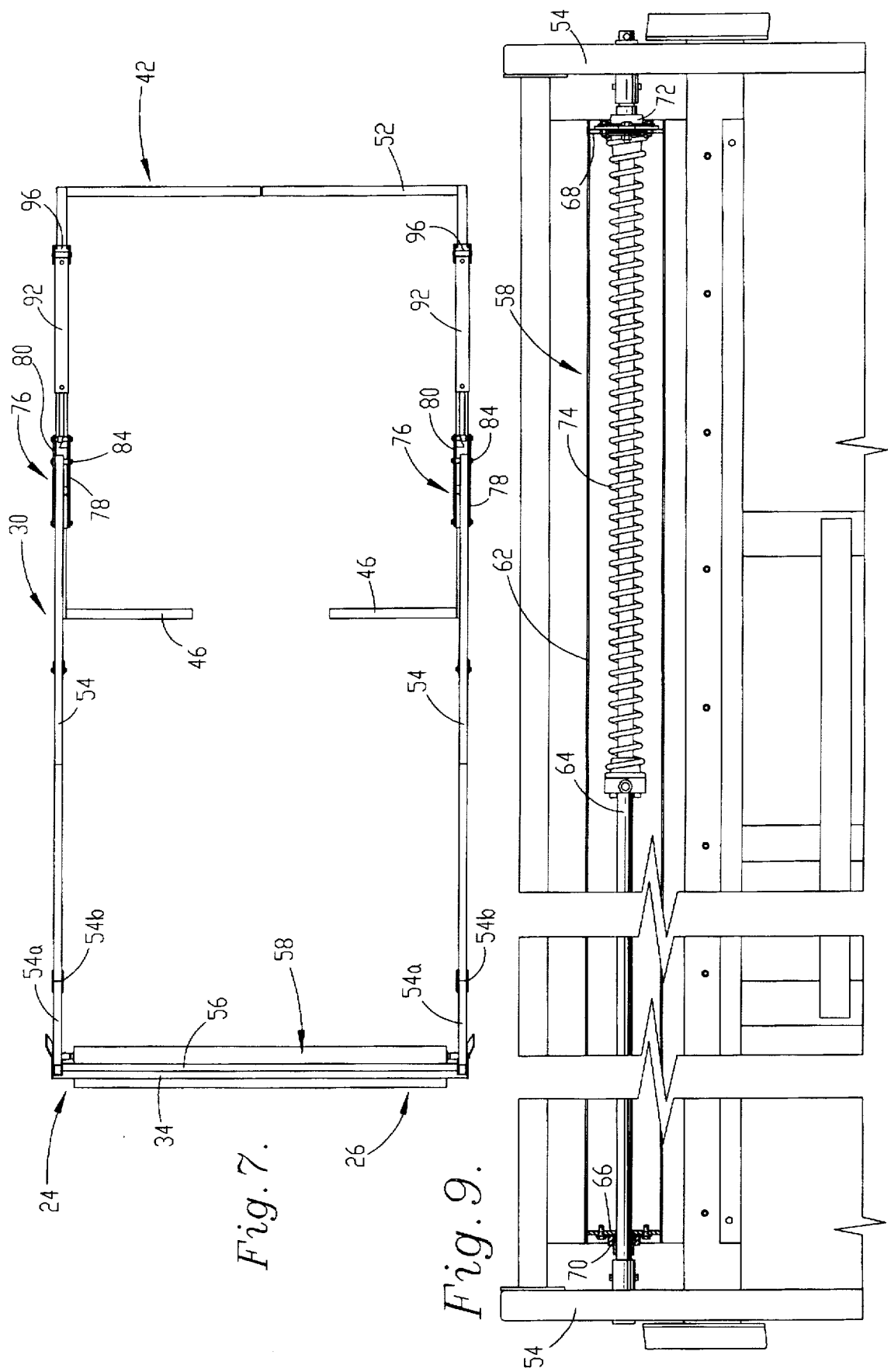

1

ADJUSTABLE COVER APPARATUS FOR INTERCHANGEABLE, MULTISIZE, OPEN TOP TRUCK CONTAINERS

This application is a continuation, of application Ser. No. 08/494,381, filed on Jun. 26, 1995, now abandoned.

The present invention relates to the field of truck covers and, more particularly, to covers of the type which are typically rolled up for storage at one end of an open top container on a truck body and then unfurled by a pair of deployment arms as the arms pull the covering or tarp over and along the top of the container. The present invention is especially concerned with tarping or covering systems which can be readily adjusted to carry out their functions with a variety of different size containers that might be used on the truck.

BACKGROUND

Most municipalities and other governmental bodies have ordinances and other regulations that require refuse hauling trucks to have coverings in the nature of tarps or other satisfactory material over the top of the refuse as it is being hauled. Thus, trucks are typically provided with a set of power-operated deployment arms that pull the tarp over the open top of the container for trash hauling and then retract the tarp back into its storage position for other activities.

One problem which has arisen in the industry involves the fact that haulers are often confronted with several different size containers throughout the day. While the beds of the truck are usually able to accommodate variously dimensioned containers without a problem, the deployment arms cannot readily deal with the fact that some containers may be taller than others, and some may be considerably longer than others unless some special adjustments are made in the arms. Thus, several different attempts have heretofore been made to provide an optimum deployment system that is capable of achieving the required flexibility and reliability. However, for a variety of reasons, conventional systems have not achieved this goal.

SUMMARY OF THE INVENTION

Accordingly, an important object of the present invention is to provide a tarp deployment system which overcomes the disadvantages of prior constructions while retaining the general concept of powered deployment arms that furl and unfurl the tarp during actuation between storage and use positions. In carrying out the foregoing, the present invention contemplates supporting the arms on the truck body in such a way that the pivot mounting points for the arms can be hydraulically shifted either forwardly or rearwardly along the bed as may be necessary or desirable to accommodate the dimensions of the particular container then being utilized on the truck. By so adjusting the pivot points, the arc of travel of the upper ends of the deployment arms is correspondingly displaced forwardly or rearwardly as the case may be, even though the arms themselves never change length and the radius of the path of travel likewise never changes in length. The hydraulic circuit for swinging the arms and the circuit for shifting the pivot points are independent of one another so that, whether the operator is deploying the tarp or furling it for storage, he can make the pivot adjustments at that same time, or at another time, as may be necessary or desirable. The cylinders in each circuit are arranged in a master-slave series relationship with one another so that the arms move in concert with one another and in the same amount at all times.

2

These and other important objects of the present invention will become apparent from the description which follows.

BRIEF DESCRIPTION OF THE DRAWINGS

FIG. 1 is a side elevational view of a truck employing a covering or tarping apparatus in accordance with the principles of the present invention, the deployment arms being swung to their rearmost positions with the tarp fully deployed and with the pivot point for the arms adjusted to a forward position;

FIG. 2 is a side elevational view of the same truck but with a taller container and showing how the tarping apparatus of the present invention may have its pivot points shifted to a different location as may be necessary to enable the deployment arms to accommodate the additional height of the different container;

FIG. 3 is an isometric view of the tarping apparatus itself removed from the truck body to illustrate overall details of construction;

FIGS. 4, 5 and 6 are schematic side elevational views of the apparatus illustrating the manner in which the tarp is unfurled and deployed across the top of a container and the pivot point of the arms is adjusted.

FIG. 7 is a top plan view of the apparatus;

FIG. 8 is a front end elevational view thereof;

FIG. 9 is an enlarged, fragmentary front end elevational view of the apparatus with parts broken away to reveal details of construction of the furling roll of the apparatus;

FIG. 10 is a further enlarged, fragmentary detail view of one end of the furling roll;

FIG. 11 is an enlarged, fragmentary cross-sectional view of one of the pivot slides of the apparatus showing details of construction.

DETAILED DESCRIPTION

Figure 4:
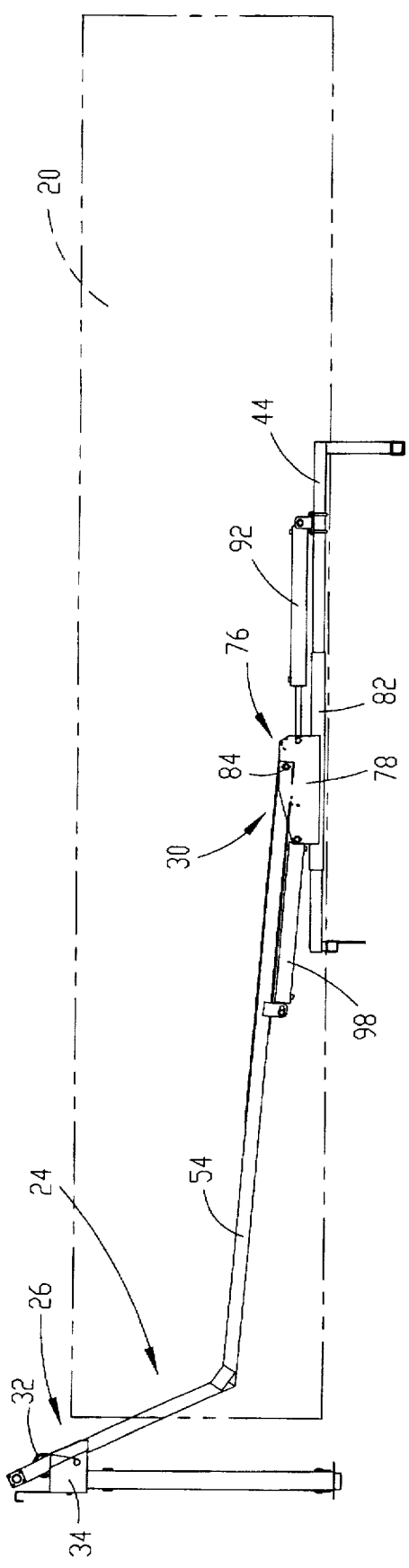

The truck 10 in FIGS. 1 and 2 has a mobile chassis or bed 12 provided with ground wheels 14. In the illustrated embodiment the bed 12 carries a tilt frame 16 that is selectively raised and lowered between horizontal and tilted positions by one or more large hydraulic tilt cylinders 18 connected between the bed 12 and the tilt frame 16. Thus, containers such as the container 20 in FIG. 1 and the container 22 in FIG. 2 may be rolled off and on the truck using hoisting or winching mechanism not visible in the drawings but well understood by those skilled in the art. The containers 20, 22 are open top containers and have been selected for purposes of illustration herein as merely two examples of many differently sized and shaped containers typically utilized in refuse hauling operations such as contemplated herein. Each of the containers illustrated herein has an open top, identified by the numeral 20a on the container 20 and the numeral 22a on the container 22.

In accordance with the present invention the truck 10 is provided with tarping apparatus broadly denoted by the numeral 24 for providing a temporary, relatively light, protective containment covering over the otherwise open tops of the containers during hauling operations. The apparatus 24 includes two main, physically separate but functionally related parts, namely an upstanding gantry or mast 26 at the front of the bed 12 just behind the cab 28, and a tarp deployment unit 30 situated rearward on the bed 12 just above the rear wheels 14. Broadly speaking, the mast 26 serves as a front anchor point for the tarp 32 of the apparatus and as a rest or stand for the arms of the deployment unit 30 during periods of non-use as will hereinafter be explained. On the other hand, the deployment unit 30 serves to spread the tarp 32 over the container in preparation for transport and to pull the tarp back off the container when it is to be left uncovered. Parenthetically, it is to be noted that the term "tarp" as used herein is defined in a broad, inclusive sense that encompasses a wide variety of different types of webs of flexible material. Such material may be an essentially solid, tightly woven material in the nature of a canvass fabric, for example, or it may be more in the nature of an open mesh or screen with pronounced openings throughout its surface area. In all of its versions, however, the tarp serves the same general purpose, i.e., that of containing or confining the contents of the truck during hauling operations.

The mast 26 is perhaps shown best in its overall configuration in FIG. 3. It will be seen in that figure that mast 26 is generally T-shaped, having a horizontal cross head 34 extending transversely of the truck, and a pair of upright legs 36 which are affixed to the cross head 34 and support the latter above the bed 12. The legs 36 are rigidly affixed to the bed 12 but are telescopic in nature so that the cross head 34 can be raised and lowered for vertical adjustment purposes as may be seen by comparing the positions of the mast 26 in FIGS. 1 and 2. A hydraulic cylinder 38 (FIG. 3) extends between the cross head 34 and a transversed base member 40 of the mast 26 to raise and lower the cross head 34.

The deployment unit 30 includes a generally U-shaped, horizontal frame 42 as shown best in FIG. 3. The frame 42 overlies the rear wheels 14 of the truck and is welded directly to portions of the body 12, or indirectly to the body 12 through a possibly available subframe of the tilt frame 16 which is bolted or otherwise secured to the body 12. A pair of fore-and-aft rails 44 of the frame 42 extend along opposite outside extremities of the body 12 above the rear wheels 14 and are provided with inwardly extending braces 46 and 48 at their forward ends which assist in securing the frame 42 to the body 12. At their rearward ends, the rails 44 have respective depending legs 50 that overhang the rearmost rear wheels 14 and are interconnected by a common transverse beam 52.

The tarp deployment unit 30 also includes a pair of long, slender arms 54 situated on opposite sides of the container 20 or 22 and swingably supported by the frame 42. Each of the arms 44 has an downturned terminal portion 54a that gives the arm somewhat of a hooked or bent configuration and causes the presentation of an elbow 54b that does not pivot or hinge, but is instead totally fixed. A torque bar 56 rigidly interconnects the arms 54 at the outermost tips of the terminal portions 54a so that the arms are constrained to move together as a unit. In addition, spaced slightly inboard from the torque bar 56 is a take-up roll 58 which likewise spans the arms 54 but is rotatably journaled thereby for storing and paying out the tarp 32. In the illustrated embodiment, one end of the tarp 32 is fixed to an anchor bar 60 (FIGS. 3, 4, 5, and 6) on the cross head 34 of the mast 26, while the opposite end is secured to the take-up roll 58 and is furled onto and unfurled from such roll during swinging of the arms 54 back and forth along the length of the truck.

Slack in the tarp 32 is automatically taken up by the take-up roll 58 by virtue of the spring-loaded design of the roll 58. As shown in FIGS. 9 and 10, for example, the take-up roll 58 includes a hollow cylinder 62 that almost spans the distance between the arms 54 and is supported for rotation upon a long shaft 64 that does completely span the arms 54 and is carried thereby. A pair of bulk heads 66 and 68 fixed to opposite ends of the cylinder 62 are provided with respective bearings 70 and 72 that rotatably receive the shaft 64 such that the cylinder 62 can rotate relative to the shaft 64 about its longitudinal axis. A torsion spring 74 is anchored at one end to the bulk head 68 and at its opposite end to the shaft 64 such that as the roll 58 is rotated in a clockwise direction (viewing FIGS. 5, 6 and 7, for example) the torsion spring 74 is loaded up with spring force seeking to re-establish an unloaded condition achieved by rotating the roll 58 in a counterclockwise direction. Such restoring force is utilized to cause the tarp 32 to automatically become coiled or furled up on the take-up roll 58 as the arms are swung toward the front of the truck after being in a more rearwardly disposed location.

The arms 54 are coupled with the frame 42 via a pair of special sliding pivot carriages 76, there being one of such carriages 76 for each arm 54. Each carriage 76 includes a pair of upright, laterally spaced plates 78 and 80 (FIGS. 3 and 11) that are rigidly affixed along their lower extremities to a square-in-cross-section sleeve 82 slidably received on the correspondingly square-in-cross-section rail 44. The plates 78,80 of each pair cooperate to support a transverse pivot pin 84 which serves as the pivot for the corresponding deployment arm 54. A pair of cotter keys 86 and 88 at opposite ends of the pin 84 on outboard sides of the plates 78,80 keep the pin 84 from shifting axially out of the plates 78,80, and a bushing 90 encircles the pin 84 between the plates 78,80 to provide for rotatable support of the arm 54 on the pin 84 without untoward wear.

The carriages 76 may be adjustably shifted fore-and-aft along their respective rails 44 by a pair of fluid pressure piston and cylinder assemblies 92 and 94. Each of the cylinder assemblies 92,94 has its anchor end secured to the corresponding rail 44 in such a manner that the anchor point for the cylinder can be adjustably repositioned along the rail if that becomes necessary in order to accommodate a particular range of container dimensions encountered by the operator during his use of the system. In this regard it may be seen from FIG. 3 that each of the cylinder assemblies 92,94 may be attached to its corresponding rail 44 via a U-bolt clamp 96 or the like.

In order to swing the deployment arms 54 during operation, power mechanism in the form of a pair of hydraulic piston and cylinder units 98 and 100 is provided. Each cylinder unit 98,100 extends between a forward connection point 102 on the carriage 76 and a depending lug 104 on the arm 54. Thus, the cylinders 98,100 swing the arms 54 about the pivots 84 which become located along the rails 44 at positions determined by the hydraulic cylinders 92 and 94.

Figure 12:
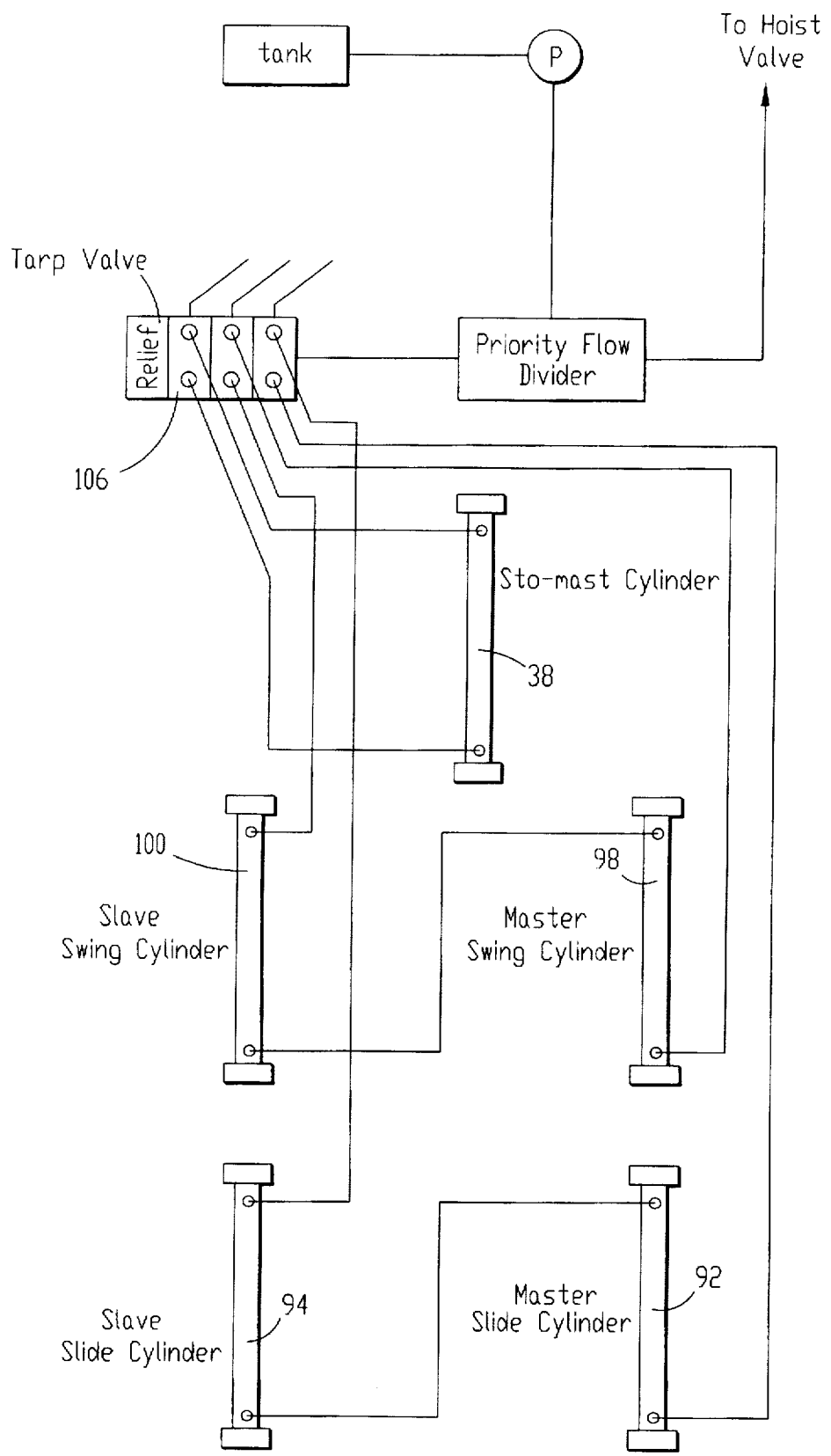
FIG. 12 is a schematic hydraulic flow diagram of the operating circuits of the apparatus.

FIG. 12 illustrates important relationships in the hydraulic flow circuit of the various cylinders associated with the tarping apparatus. It will be seen in this respect that the two slide cylinders 92,94 are connected in a master-slave series relationship with one another so that the two pivots 84 are adjusted simultaneously and in the same amount when the cylinders are activated. Likewise the two swing cylinders 98,100 for the arms 54 are flow connected in a master-slave series relationship with one another so that both the arms 54 are essentially moved in unison and to the same extent when the cylinder 98,100 are operated. Note that the volumes of the various pairs of cylinders need to be carefully coordinated with one another so that the effective cross-sectional area of a chamber from which the oil is leaving matches the effective cross-sectional area of a chamber into which the oil is flowing. Moreover, preferably the cylinders 98,94 and 98,100 are rephasing cylinders, as well understood by those skilled in the art, such that at the end of each full extension stroke, oil is allowed to bypass the piston to the extent necessary to re-establish uniform positioning and movement of the cylinders.

The bank of tarp valves 106 illustrated in FIG. 12 is preferably positioned outside the cab of the truck in such a location that the operator may stand alongside the vehicle and manipulate the various control handles (not shown) associated with such valve 106. Thus, it is contemplated that the operator will manipulate the valve bank 106 while standing alongside the truck in a position in which he can readily observe the movements of the tarping apparatus 24 as it is operated.

OPERATION

Use of the tarping apparatus 24 may be illustrated by reference to FIGS. 4–6. When the container 20 is to be in an open and uncovered condition, the deployment arms 54 are in their forwardly swung positions of FIG. 4, with the rolled up tarp 32 resting upon the cross head 34 of the mast 26. Thus, the weight of the rolled up tarp 32 is taken off the arms 54 at this time and supported instead by the mast 26, which avoids the risk of damage to the long arms 54 as the vehicle bumps and bounces along during over the road travel. This also protects the arm 54 during the time that the container 20 is being loaded and unloaded from the truck bed 12.

The mast 26 in FIG. 4 is illustrated as being in its fully retracted or shortest position. This is consistent with the location of the upper front corner of the container 10 which comes to a point essentially level with the cross head 34. When the front corner of the container is essentially level with or below the cross head 34, the tarp roll 32 can clear container when the tarp is being deployed and there is no reason to raise the mast 26 any further. However, if a taller container is utilized, it may be necessary to telescopically extend the mast 26 until the cross head 34 is raised to the desired elevation.

In this connection, it may or may not be necessary when the mast 26 is extended to also reposition the pivot point 84 of the deployment arms 54, depending upon the extent of adjustment of the mast and the desire to keep the tarp roll 32 supported on the cross head 34 during the intervals between deployments of the tarp. If it should become necessary to shift the pivot points 84 forwardly in order to keep the tarp roll 32 on the raised mast 26, it is only necessary to extend the slide cylinders 92,94 by the necessary amount, which will appropriately position the pivots 84.

As the deployment arms 54 are swung rearwardly as shown in FIG. 5 by the swing cylinders 98,100, the tarp 32 pays out from the take-up roll 58 and is pulled over and along the top of the container 20. Such rearward swinging of the deployment arms 54 continues until the tarp 32 has been pulled completely over the top of the container from front to rear as illustrated in FIG. 6, at which time the cylinders 98,100 are deactivated. Preferably, the take-up roll 58 is rested upon the rear corner of the container 20 during further hauling operations so that the load of the take-up roll 58 is borne by the container instead of by the arms 54. In order to accomplish positioning of the roll 58 in this manner, however, it may be necessary to actuate the slide cylinders 92,94 in the appropriate direction to either retract the roll 58 onto the rear corner of the container or to move it further rearwardly as may be necessary or desirable.

Figure 6:
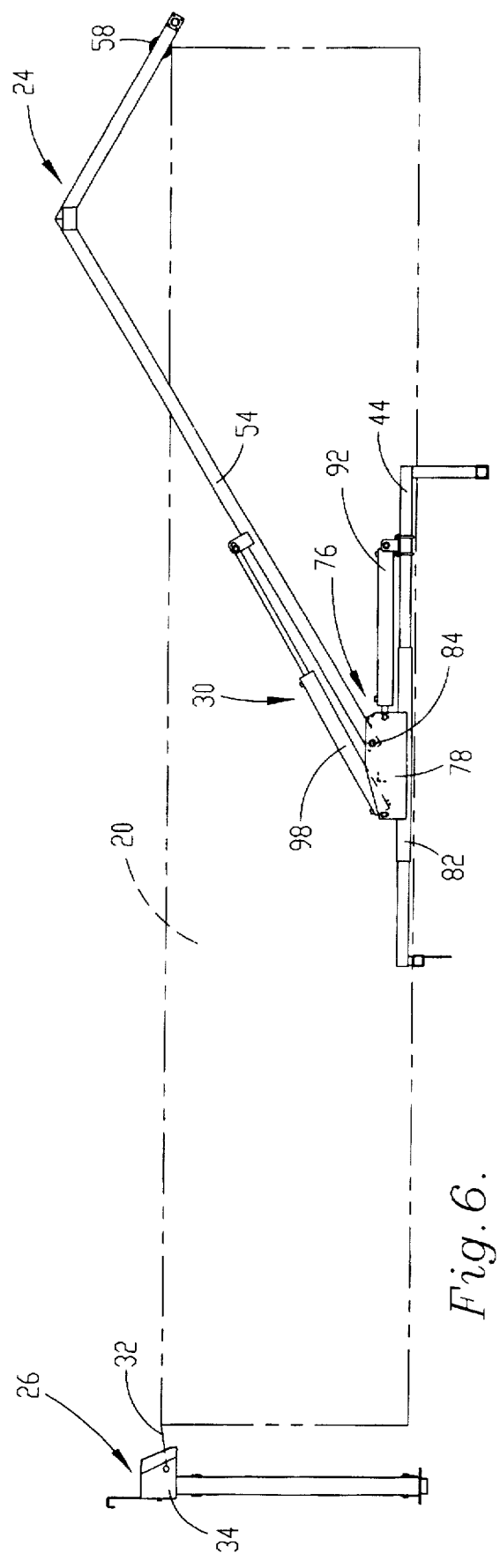

FIG. 6 shows the pivot points 84 shifted somewhat rearwardly from their FIG. 4 positions so as to place the take-up roll 58 at the proper position. The arms 54 may be left in this condition as the vehicle is driven to the dump site and then, upon arrival, swung forwardly back to their FIG. 4 positions to uncover the contents of the container. As the arms 54 are moving forwardly during such return action, the torsion spring 74 within the take-up roll 58 seeks to reestablish its unloaded condition, thus causing the roll 58 to rotate in a counterclockwise direction viewing FIG. 6 and coil up the available slack of the tarp onto itself. When the arms 54 are fully forward, all of the tarp is fully coiled up and the arms are resting on the mast.

FIG. 2 illustrates the situation where a taller container 22 is utilized in connection with the truck. This situation necessitates extending the mast 36 so as to raise the cross head 34 significantly beyond the elevation of FIG. 1. As earlier mentioned, it is desirable to have the cross head 34 located at approximately the same level as the upper front corner of the container so that the roll of tarp is assured of clearing the front corner during deployment of the tarp. However, such raising of the mast 26 may in turn necessitate repositioning of the pivot points 84 in order to cause the tarp roll to rest on the cross head 34 during periods of non-use and to assure that the arc of travel of the tarp roll is displaced far enough forwardly that the tarp roll will indeed clear the front corner of the container at the necessary times. FIG. 2 also illustrates that when the tarp is fully deployed and the roll 58 is resting on the rear corner of the container 22, the pivot points 84 may need to be positioned further rearwardly than is true with the container 20 shown in FIG. 1. Again, this can be carried out quite easily by simply retracting the slide cylinders 92,94 to the appropriate extent, causing the carriages 76 to slide rearwardly along the rails 44 until reaching the desired positions.

It should thus be apparent that the tarping apparatus herein disclosed provides a significant improvement over conventional constructions. For example, by virtue of the slide pivot concept of the present invention, hydraulic hoses and cylinders which might otherwise be used to hinge and contract or extend the arms are not present on the arms at all. Thus, the cantilevered loading experienced by the arms can be reduced and the risk of damaging the hydraulic lines by crimping or clamping them between portions of the buckling arms can be completely avoided. Having the slide cylinders 92,94 down at the level of the body of the truck keeps the cylinders and their hoses in a neat, protected and unobtrusive location, in contrast to prior arrangements.

Moreover, by avoiding the need for a pivoting elbow joint in each of the arms, the reliability of the apparatus is increased and maintenance is facilitated. By having a rigid elbow in the arms at a point which might otherwise be jointed, the risk of premature wear and failure at that location is significantly reduced. In the event that one or more of the arms should ever need replacing, the replacement arm is a relatively simple, inexpensive component compared to an arm which has a hinging elbow joint and cylinder or is comprised of a telescoping hydraulic cylinder.

Still further, it will be appreciated that the design of the present invention is particularly well suited to withstand rough treatment and abrupt handling such as might be expected in connection with refuse hauling operations. The non-jointed arms and safely situated slide cylinders are particularly significant in this respect.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby state his intent to rely on the Doctrine of Equivalents to determine and assess the reasonably fair scope of his invention as pertains to any apparatus not materially departing from but outside the literal scope of the invention as set out in the following claims.

We claim:

1. A tarping apparatus for attachment to the elongated bed of a truck for use in providing a temporary covering for an open top container on the truck, said apparatus comprising:
    a generally U-shaped frame for fixed securement to the truck bed,
    said frame including a pair of laterally spaced elongated side rails for disposition on opposite sides of the container when the apparatus is attached to the bed, a bar assembly rigidly interconnecting the rails adjacent one end thereof, and a pair of braces extending inwardly from the other end of each of the rails for connection to the truck bed;
    a pair of carriages shiftably carried by respective ones of the rails;
    a deployment member having a pair of arms pivotally mounted on respective ones of the carriages for swinging of the member about a pair of aligned pivot axes, with the arms being configured for disposition on opposite sides of the container when the apparatus is attached to the truck bed;
    a tarp coupled with the deployment member for covering the container as the member is swung in one direction along the container and uncovering the container as the member is swung in the opposite direction;
    power mechanism operably coupled with the deployment member for effecting said swinging of the member; and
    selectively operable power structure coupled with said carriages for adjustably shifting the pivot axes of the member along the frame to accommodate containers of different sizes on the truck.

2. A tarping apparatus as claimed in claim 1,
    said power mechanism comprising a pair of fluid pressure piston and cylinder units coupled with respective ones of the arms of the deployment member.

3. A tarping apparatus as claimed in claim 2,
    said piston and cylinder units being connected to one another in a master-slave series relationship to provide simultaneous and coequal movement of the arms.

4. A tarping apparatus as claimed in claim 1,
    said power structure comprising a pair of fluid pressure piston and cylinder assemblies coupled with respective ones of the carriages.

5. A tarping apparatus as claimed in claim 4,
    said piston and cylinder assemblies being connected to one another in master-slave series relationship to provide simultaneous and coequal movement of the carriages.

6. A tarping apparatus as claimed in claim 4,
    said carriages having respective ranges of motion defined between an extended position and a retracted position of respective ones of said piston and cylinder assemblies; and
    an adjustable anchor coupling the piston and cylinder assemblies to the frame for selective positioning of the assemblies to allow adjustment of the ranges of motion in a fore-and-aft direction along the frame.

7. A tarping apparatus as claimed in claim 6,
    said anchor including a pair of brackets pivotally connected to respective ones of said piston and cylinder assemblies,
    each of said brackets being connected to the respective piston and cylinder assembly adjacent one of the ends thereof.

8. A tarping apparatus as claimed in claim 7,
    each of said brackets including releasable fasteners for releasably securing to the respective rail.

9. A tarping apparatus as claimed in claim 1,
    said bar assembly including a pair of posts extending downwardly from respective ones of said rails, and a transverse beam spanning between the posts adjacent the lowermost ends thereof.

10. A tarping apparatus as claimed in claim 9,
    each of said pair of braces being substantially perpendicular to the respective rail, with the braces of each pair being angled relative to one another.

11. A tarping apparatus as claimed in claim 1; and
    an upstanding mast member for fixed securement to the truck bed,
    said deployment member swinging generally away from the mast member in said one direction and generally toward the mast member in said opposite direction,
    said tarp being coupled between the members.

12. A tarping apparatus as claimed in claim 11,
    said mast member and said frame being separate components of the apparatus.

13. In a tarping apparatus for attachment to the bed of a truck for use in providing a temporary covering for an open top container on the truck, the improvement comprising:
    a frame for fixed securement to the truck bed;
    a pair of laterally spaced carriages shiftably carried by said frame and configured for disposition on opposite sides of the container when the apparatus is on the truck bed;
    a deployment member having a pair of arms pivotally mounted on respective ones of the carriages for swinging of the member about a pair of aligned pivot axes, with the arms being configured for disposition on opposite sides of the container when the apparatus is attached to the truck bed;
    a tarp coupled with the deployment member for covering the container as the member is swung in one direction along the container and uncovering the container as the member is swung in the opposite direction;
    power mechanism operably coupled with the deployment member for effecting said swinging of the member; and
    a pair of selectively operable fluid pressure piston and cylinders assemblies coupled with respective ones of said carriages for adjustably shifting the pivot axes of the member along the frame to accommodate containers of different sizes on the truck,
    said piston and cylinder assemblies being connected to one another in a master-slave series relationship to provide synchronous and coequal movement of the carriages,
    said carriages having respective ranges of motion defined between an extended position and a retracted position of respective ones of said piston and cylinder assemblies; and
    an adjustable anchor coupling the piston and cylinders assemblies to the frame for selective positioning of the assemblies to allow adjustment of the ranges of motion in a fore-and-aft direction along the frame.

14. In a tarping apparatus for attachment to the bed of a truck for use in providing a temporary covering for an open top container on the truck, the improvement comprising:

a frame for fixed securement to the truck bed;

a pair of laterally spaced carriages shiftably carried by said frame and configured for disposition on opposite sides of the container when the apparatus is on the truck bed;

a deployment member having a pair of arms pivotally mounted on respective ones of the carriages for swinging of the member about a pair of aligned pivot axes, with the arms being configured for disposition on opposite sides of the container when the apparatus is attached to the truck bed;

a tarp coupled with the deployment member for covering the container as the member is swung in one direction along the container and uncovering the container as the member is swung in the opposite direction; and selectively operable power structure coupled with said carriages for adjustably shifting the pivot axes of the member along the frame to accommodate containers of different sizes on the truck, said carriages each having a range of motion defined between an extended position and a retracted position of said power structure; and an adjustable anchor coupling the power structure to the frame for selective positioning of the structure to allow adjustment of the ranges of motion in a fore-and-aft direction along the frame.

15. In a tarping apparatus as claimed in claim 14, said power structure including a pair of fluid pressure piston and cylinder assemblies coupled with respective ones of said carriages.

16. In a tarping apparatus as claimed in claim 15, said anchor including a pair of brackets connected to respective ones of said piston and cylinder assemblies, each of said brackets being connected to the respective piston and cylinder assembly adjacent one of the ends thereof.

17. In a tarping apparatus as claimed in claim 16, each of said brackets including releasable fasteners for releasably securing to the respective rail.

18. In a tarping apparatus as claimed in claim 16, said brackets being separate from one another so that each of said ranges of motions may be independently adjusted.

19. In a tarping apparatus as claimed in claim 15, said piston and cylinder assemblies being connected to one another in a master-slave series relationship to provide synchronous and coequal movement of the carriages.

20. In a tarping apparatus as claimed in claim 14; and an upstanding mast member for fixed securement to the truck bed, said deployment member swinging generally away from the mast member in said one direction and generally toward the mast member in said opposite direction, said tarp being coupled between the members.

\* \* \* \* \*